(12) United States Patent
Abernethy, Jr. et al.

(10) Patent No.: US 7,508,450 B1
(45) Date of Patent: Mar. 24, 2009

(54) METHOD FOR CLOSED CAPTIONING OF AUDIO VIDEO CONTENT ON A PORTABLE PLAYBACK DEVICE

(75) Inventors: Michael N Abernethy, Jr., Pflugerville, TX (US); Travis M Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/115,697

(22) Filed: May 6, 2008

(51) Int. Cl.
*H04N 7/00* (2006.01)
*H04N 5/067* (2006.01)
*H04M 1/00* (2006.01)

(52) U.S. Cl. .................. 348/465; 348/468; 348/552; 455/556.2

(58) Field of Classification Search ............... 348/465, 348/468, 564, 739, 552, 553, 569, 714, 718; 725/137, 141, 133, 151; 455/556.1, 556.2
See application file for complete search history.

(56) References Cited

U.S. PATENT DOCUMENTS

| 5,543,851 | A | * | 8/1996 | Chang .................. 348/468 |
| 5,572,260 | A | * | 11/1996 | Onishi et al. ............. 348/460 |
| 5,805,173 | A | * | 9/1998 | Glennon et al. ........... 345/501 |
| 5,883,675 | A | * | 3/1999 | Herz et al. ................ 348/465 |
| 5,946,046 | A | | 8/1999 | You et al. |
| 5,959,687 | A | | 9/1999 | Dinwiddie et al. |
| 5,995,709 | A | * | 11/1999 | Tsuge ..................... 386/95 |
| 6,061,056 | A | * | 5/2000 | Menard et al. ............. 715/704 |
| 6,366,325 | B1 | * | 4/2002 | Wang ...................... 348/465 |
| 6,430,357 | B1 | * | 8/2002 | Orr ........................ 386/69 |
| RE39,003 | E | * | 3/2006 | Orr et al. .................. 348/564 |
| 7,050,109 | B2 | | 5/2006 | Safadi et al. |
| 7,095,947 | B2 | * | 8/2006 | van der Schaar ........... 386/66 |
| 7,221,405 | B2 | * | 5/2007 | Basson et al. ............. 348/468 |
| 2002/0067428 | A1 | * | 6/2002 | Thomsen ................. 348/465 |

FOREIGN PATENT DOCUMENTS

WO    WO 2007/064340 A1 *  6/2007

* cited by examiner

*Primary Examiner*—Victor R Kostak
(74) *Attorney, Agent, or Firm*—Cantor Colburn LLP; Herman Rodriguez

(57) ABSTRACT

A method for presenting closed captioning text on device display screens, the method includes: receiving a continuous flow of audio video (A/V) content information; separating closed captioning information from video content contained in the A/V content information flow; accumulating the closed captioning information in a first memory buffer; displaying the video content without the closed captioning information to form a first video snippet; determining one of the following video mode conditions: whether a first time limit for viewing the video snippet been exceeded, whether the capacity of the first memory buffer for the closed captioning been exceeded, and whether a closed caption command to display the accumulated closed captioning been received; wherein in the event one or more of the video mode conditions occurs: retrieving the accumulated closed captioning from the first memory buffer; and displaying the accumulated closed caption information without the video content.

4 Claims, 4 Drawing Sheets

METHOD FOR CLOSED CAPTIONING OF AUDIO VIDEO CONTENT ON A PORTABLE PLAYBACK DEVICE

BACKGROUND OF THE INVENTION

1. Field of the Invention

The present invention relates generally to portable audio video playback and communication devices and, more particularly, to a method, article, and system for providing closed captioning on portable electronic and communication device display screens.

2. Description of the Related Art

As portable electronic devices have continued to evolve, their level of sophistication and abilities to carryout a myriad of applications have progressed as well. Initially, a portable electronic device was dedicated to voice communication, such as a cell phone, or to basic computing functions and scheduling, such as a personal digital assistant (PDA). However, the present generation of portable devices has combined computing and voice communications in a single unit, while offering additional features of data communication over the Internet, delivery of multimedia content (video/audio), as well as gaming functions. The increased functionality of the present generation of portable devices has increased their usage throughout a user's day.

Closed captioning (CC) (commonly known as subtitles, and also referred to as subtitles for the hearing impaired) allows people who are deaf, hard of hearing, learning a new language, beginning to read, in a noisy environment, or otherwise prefer to read a transcript or dialog of the audio portion of a video, film, or other presentation. As video content is shown, text captions are displayed concurrently that transcribe (although not always verbatim) speech and other relevant sounds. The term "closed" in closed captioning refers to the fact that not all viewers see the captions, only those who decode or activate the captions, which allows people to understand the audio portion and enjoy a televised program while hiding it from those who do not. Closed captions are distinguished from "open captions," where all viewers see the captions, calling permanently visible captions in a video, film, or other medium "open", "burned-in", or "hardcoded" captions.

SUMMARY OF THE INVENTION

Embodiments of the present invention include a method for presenting closed captioning text on device display screens, the method includes: receiving a continuous flow of audio video (A/V) content information; separating closed captioning information from video content contained in the A/V content information flow; accumulating the closed captioning information in a first memory buffer; displaying the video content without the closed captioning information to form a first video snippet; determining one of the following video mode conditions: whether a first time limit for viewing the video snippet been exceeded, whether the capacity of the first memory buffer for the closed captioning been exceeded, and whether a closed caption command to display the accumulated closed captioning been received; wherein in the event one or more of the video mode conditions occurs: retrieving the accumulated closed captioning from the first memory buffer; and displaying the accumulated closed caption information without the video content; clearing the first memory buffer; accumulating A/V content in a second memory buffer; separating closed captioning information from video content contained in the A/V content information flow; accumulating the closed captioning information in the first memory buffer; and accumulating the video content in a third memory buffer.

TECHNICAL EFFECTS

As a result of the summarized invention, a solution is technically achieved for a method for presenting closed captioning on portable electronic and communication device display screens.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
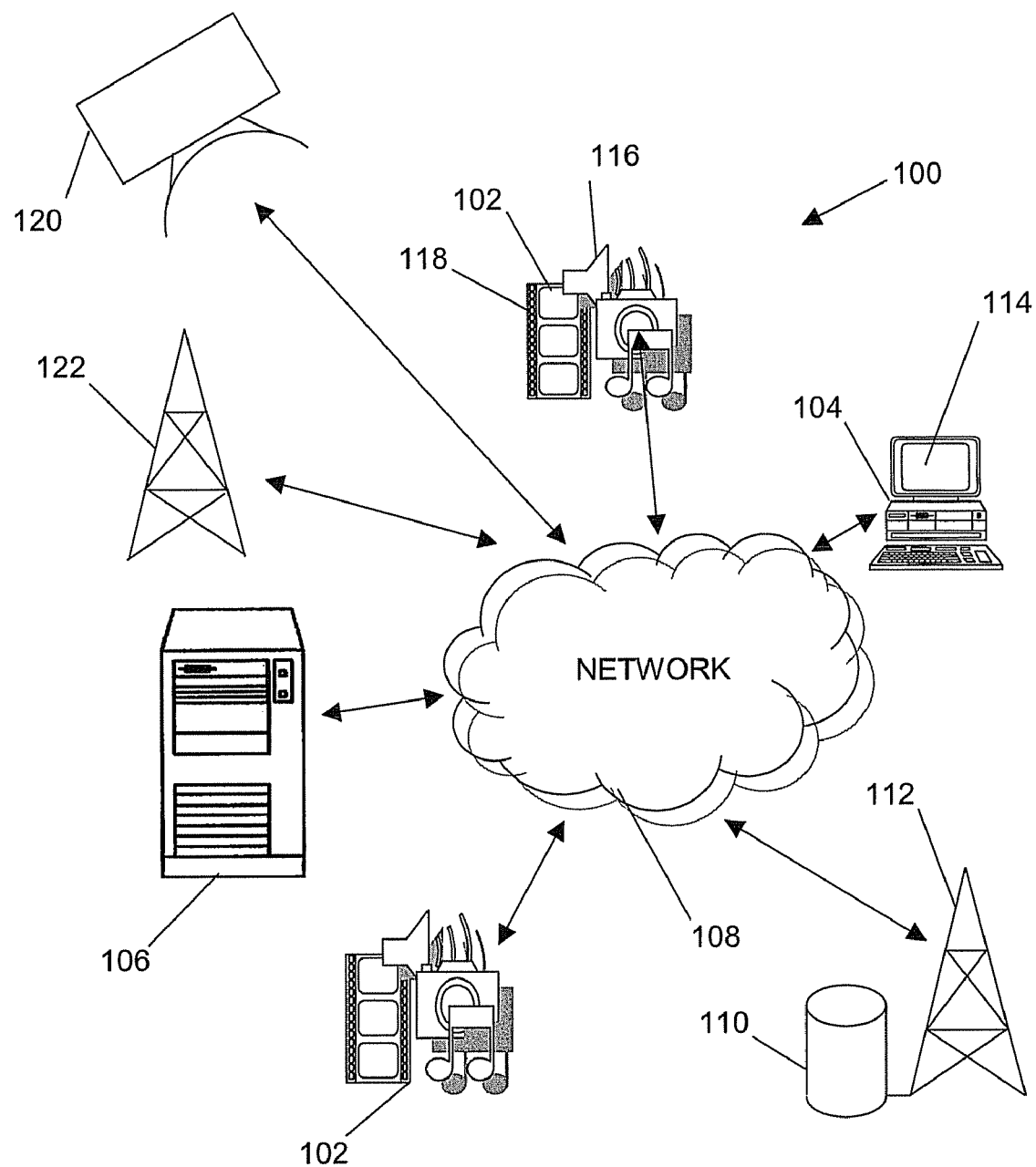
FIG. 1 is a block diagram of an exemplary system for implementing embodiments of the invention.

The detailed description explains the preferred embodiments of the invention, together with advantages and features, by way of example with reference to the drawings.

DETAILED DESCRIPTION

The widespread adoption of portable electronic and communication devices configured with audio and video (A/V) capabilities (herein referred to as portable A/V devices) presents a problem to individuals who rely on closed captioning for obtaining an understanding of the audio provided in A/V content.

The typical display screen on a portable A/V device is considerably smaller than that of a television. Typically, a television may have a display screen measuring 19 inches diagonally or larger, while a small television screen may measure 9 inches diagonally. However, on mobile or portable A/V devices, the screen may be as small as 2 inches diagonal, and it is conceivable that screen sizes would be even smaller in the future as cell phones continue to shrink in size. While portable A/V device screens are generally considered small for watching video content and television, they would be considered extremely small for accessibility reasons, specifically to utilize closed captioning for the hearing impaired. If the same relative scale used on a 25-inch television for its closed captioning size were used on a portable A/V device 2-inch screen, the closed captioning text would be too small to be readable. Conversely, if the closed captioning text were made big enough to be readable, there would be no room to actually watch the video or television on the screen. The dimensions of screens on portable A/V devices are so small that only the video or only the text could reasonably fit on the screen at one time.

Embodiments of the invention provide a method for displaying closed captioning information on portable A/V devices, without losing video quality, while ensuring that closed captioning text is readable by a user. Portable A/V devices utilizing embodiments of the invention, display video content without closed captioning information in small segments, herein referred to as video snippets, while the closed captioning information is concurrently being stored in memory. At a certain point, the video content is paused and the screen is changed to display all of the stored closed captioning information since the previous pause. The display of the stored closed captioned information would allow the user to read over the conversations from the previous video snippet with closed captioned text that is large enough to be readable by a user, since the entire screen is utilized. Embodiments of the invention are configured to allow a user to scroll the closed captioned text as well, ensuring that the text size does not need to be sacrificed to fit it in one screen. Once the user completes reading the closed captioning, they would press a button and the video would resume, repeating the process.

Embodiments of the invention may be configured to pause a video snippet after a user-defined period of time, or based on a certain amount of stored or buffered closed-captioned text has been reached. Therefore, in instances of low dialogue such as action scenes or scenery shots the video snippets may automatically be of variable length. Conversely, video may be automatically restarted when buffered video reaches a predefined size, or capacity of the video memory buffer is reached. Following the switching between video and closed captioning, or between closed captioning and video, the video or closed captioning buffers are automatically cleared, respectively. In addition, the period of time allotted to reading the closed captioning may be user configurable, before automatically switching back to another video snippet. User settings on portable A/V devices may be facilitated by graphical user interfaces (GUI).

In embodiments of the invention, the video may be automatically paused following the occurrence of a critical point in a story, as indicated by a control signal in the closed captioning information. For example, the closed caption text-display mode may be started when an important "cut point" has been encountered. A cut point may be the result of people laughing, and a user would like to see what caused the laugh. Also, when a scene cuts to another scene, it would be a logical time to enter text-display mode, since the scene has ended, and the viewer would like to end it completely as well.

Embodiments of the invention employed on cell phone devices may have user settings that are related to the cell phones user profile. For example, cell phones set to vibrate or silent mode may automatically have the closed captioning features of the present invention activated.

In an exemplary embodiment of the invention, a hearing impaired user of a cell phone with mobile TV capabilities has closed captioning turned on on their cell phone while watching television. The hearing impaired user begins to watch a television show. The received television broadcast goes through a receiver converter that strips the closed captioning from the video. The video is displayed on the cell phones screen, showing the action of the show in a video snippet. Simultaneously, the closed captioning is stored in a memory buffer on the phone while the video is being played. After a user configurable amount of time, the video pauses and begins to be stored in a memory buffer as a video snippet, and the screen changes from the video to a screen that displays all of the closed captioning text that was generated during the previous video snippet. The text on the closed captioning is normal sized text that may be read by the user. No matter how much or how little text was generated, the text will be normal size. If the text goes off the screen, the page is enabled for scrolling, to allow the user to read all of the text. Upon completion of reading the closed captioning text, the user presses a button to initiate playing of the next video snippet, and the screen displaying the closed captioning text returns to the paused video. The video begins to play automatically upon returning to the screen. The alternating process of video snippets and closed captioning screens continues as long as the programming continues, or the user disables the closed captioning feature.

In a second exemplary embodiment of the invention, a user is in a very boring conference, and wants to find something to do. The user realizes that it's about 3 pm, and one of their favorite talk shows is about to start. Since their cell phone is mobile TV enabled, with the corresponding features of embodiments of the present invention, they open up their cell phone and change the channel to the one televising the show they wish to watch. Because their phone is on silent mode, the television automatically goes into mute mode with closed captioning turned on. The user begins to watch the shows host, who is talking to a guest. The user can see that the host has just asked someone a question based on their mannerisms. The guest answers the host's question and they both laugh. The video subsequently pauses, and the user's phone changes to a text-display mode with the following text:

Host: "How did you get ready for this role?"

Guest: "I ate 4 doughnuts every morning"

Group Laughter After the user reads the text, the user giggles as well. After the user's laughter subsides, they decide to go back to the show, and they press the "OK" button on their cell phone. The closed caption text-display mode disappears, and the video resumes automatically, with the host or the guest again talking on the screen. The process continues for the entire talk show.

In additional embodiments of the invention, the switching between video and a closed captioning screen may be automatically triggered based on the detection of a scene change or other encoded artifact in the video stream.

FIG. 1 illustrates an exemplary system 100 for providing closed captioning on portable electronic and communication device display screens according to embodiments of the invention. The system 100 includes remote devices in the form of multimedia devices 102, and portable computer devices 104 configured with software and display capabilities 114 for implementing graphical user interface (GUI) aspects of the invention described herein. The multimedia devices 102 may be mobile communication and entertainment devices, such as cellular phones, portable TVs, and gaming devices that are wirelessly connected to a network 108. The multimedia devices 102 have video displays 118 and audio capabilities 116 for implementing the GUI described herein. The network 108 may be any type of known network including a fixed wire line network, cable and fiber optics, over the air broadcasts, satellite 120, local area network (LAN), wide area network (WAN), global network (e.g., Internet), intranet, etc. with data/Internet capabilities as represented by server 106. Communication aspects of the network are represented by cellular base station 110 and antenna 112, as well as over the air broadcast of A/V content via antenna 122.

Each remote device (102, 104) may be implemented using a general-purpose computer executing a computer program for carrying out the GUI described herein. The computer program may be resident on a storage medium local to the remote devices (102, 104), or maybe stored on the server system 106 or cellular base station 110. The server system 106 may belong to a public service. The remote devices (102, 104) may be coupled to the server system 106 through multiple networks (e.g., intranet and Internet) so that not all remote devices (102, 104) are coupled to the server system 106 via the same network. The remote devices 110, and the server system 106 may be connected to the network 108 in a wireless fashion, and network 108 may be a wireless network. In a preferred embodiment, the network 108 is a LAN and each remote device 110 executes a user interface application (e.g., web browser) to contact the server system 106 through the network 108. Alternatively, the remote devices 110 may be implemented using a device programmed primarily for accessing network 108 such as a remote client.

Figure 2A:
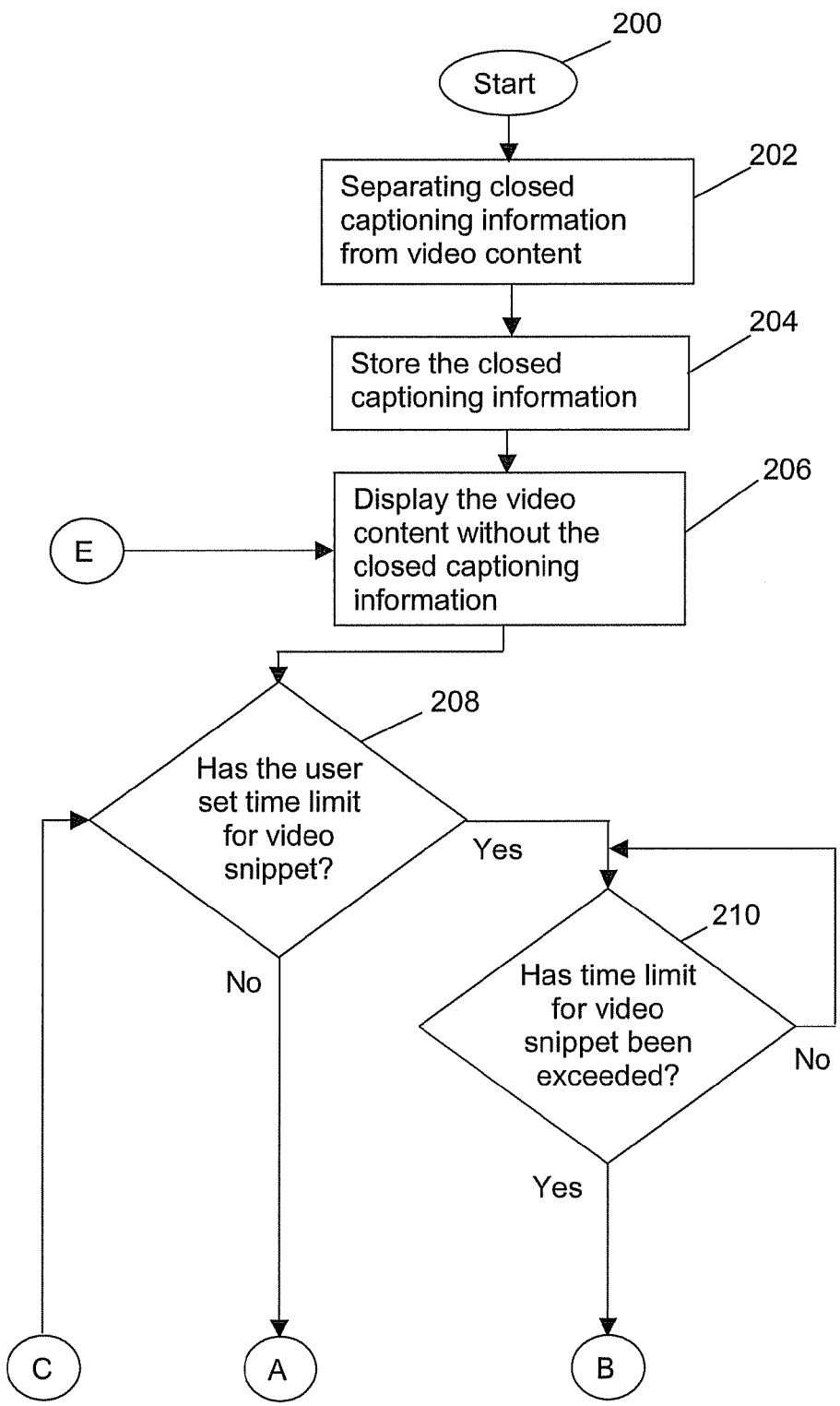
FIGS. 2A-2C form a flowchart illustrating a method for presenting closed captioning on portable device display screens according to embodiments of the invention.
Figure 2B:
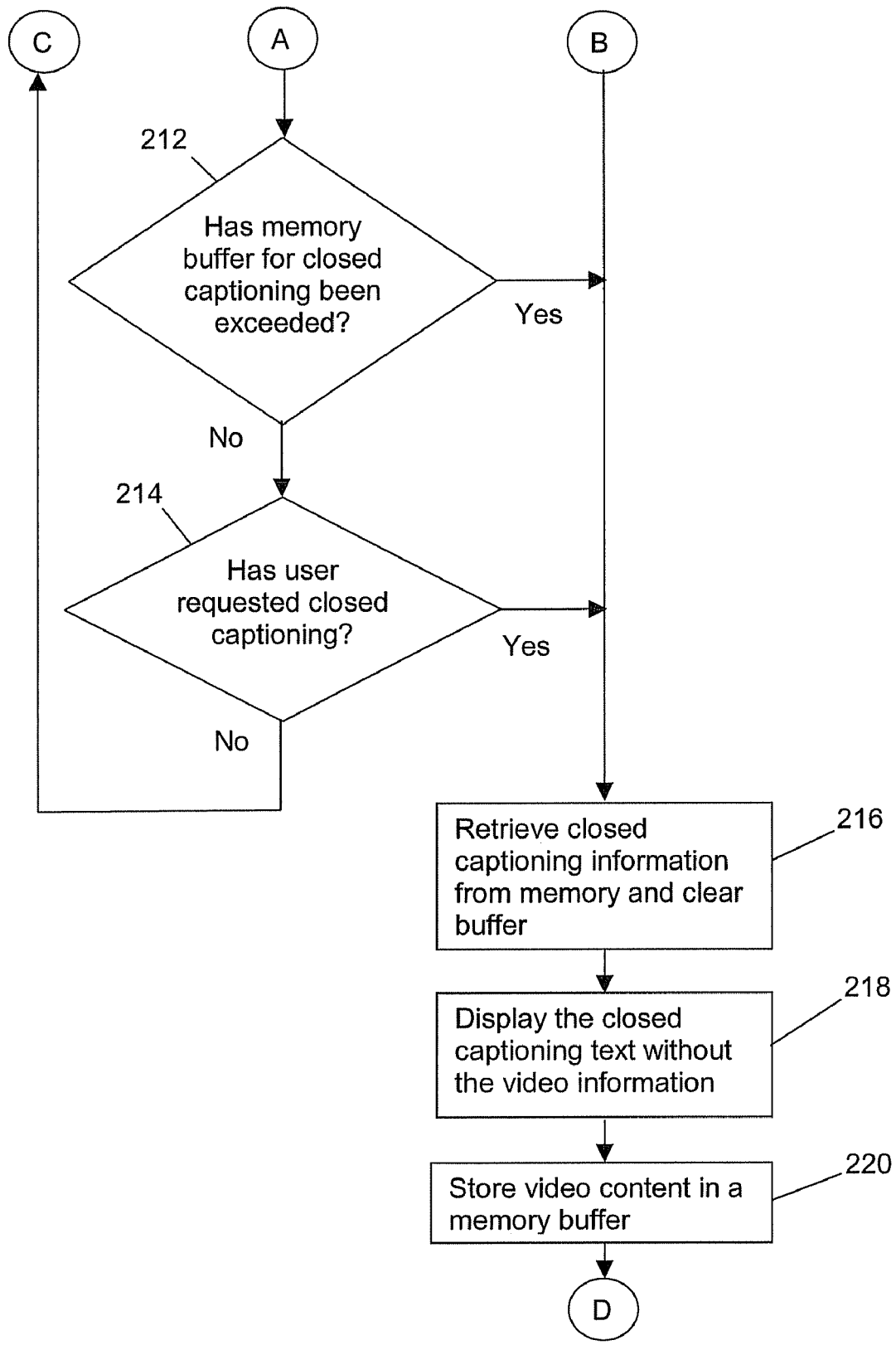
Figure 2C:
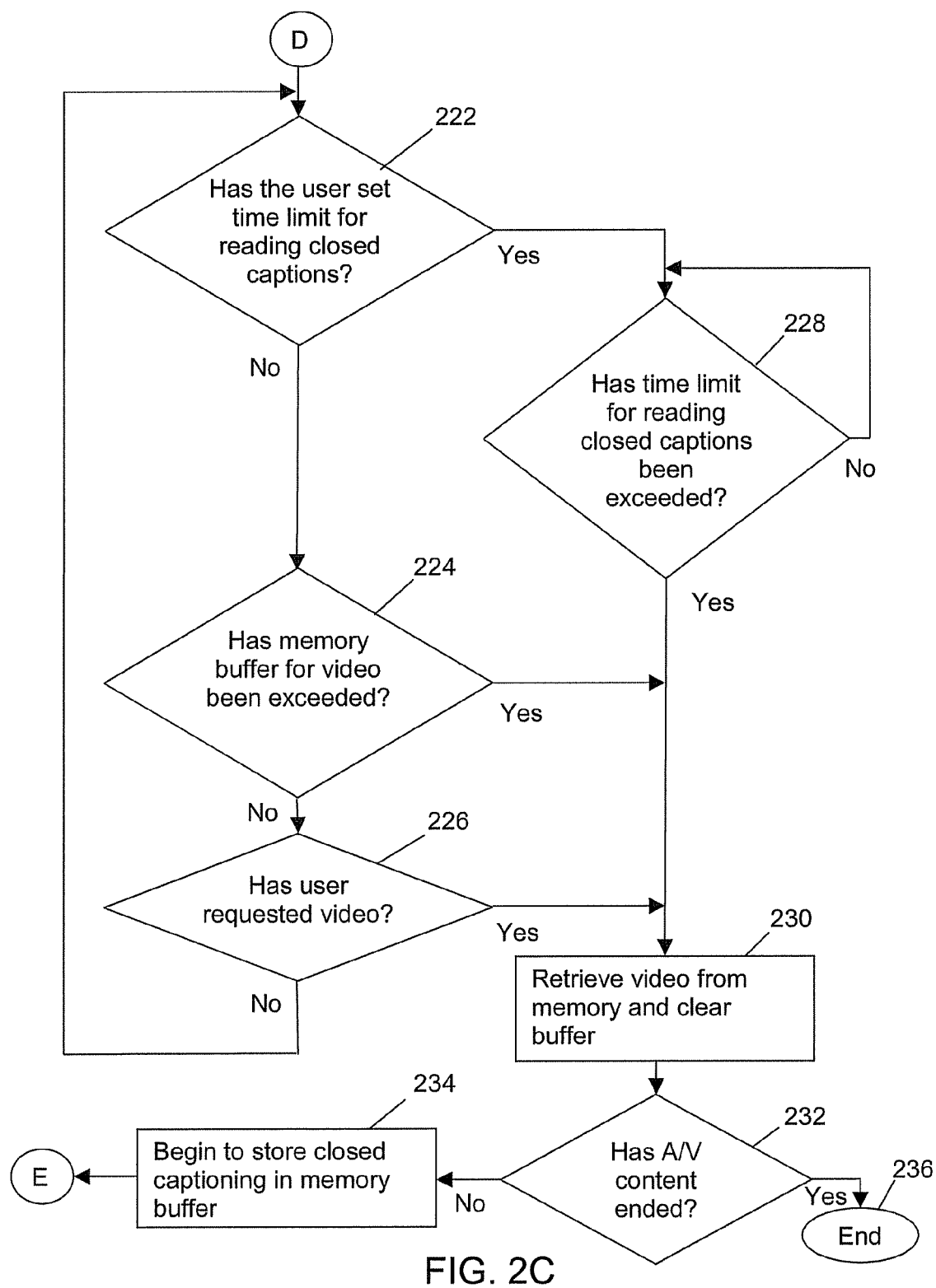

FIGS. 2A-2C is a flowchart illustrating a method for presenting closed captioning on portable A/V device display screens according to embodiments of the invention. The process starts (block 200) with the reception of a continuous flow of audio video (A/V) content (block 201), the separation of closed captioning information from video content information in A/V content (block 202), and storing the closed captioning information in a memory buffer (block 204), while concurrently displaying the video content as a without the closed captioning information (herein referred to as a video snippet) on a portable A/V device (block 206). In the event the user has set a time limit for viewing a video snippet (decision block 208 is Yes), a determination is made if the time limit for the video snippet has been exceeded (decision block 210). In the event the user has not set a time limit for the video snippet (decision block 210 is No), and proceeding to FIG. 2B, a determination is made if the memory buffer for closed captioning has been exceeded (decision block 212). In the event the memory buffer for closed captioning has not been exceeded (decision block 212 is No), and the user has not manually requested closed captioning to be displayed (decision block 214 is No), the process loops back to block 208. In the event the time limit for the video snippet has been exceeded (decision block 208 and 210 are Yes), the memory buffer for closed captioning has been exceeded (decision block 212 is Yes), or the user has requested the closed captioning to be displayed (decision block 214 is Yes), the closed captioning information is retrieved from memory, and the buffer is cleared (block 216). Concurrently, the display switches from video content to closed captioning without the video content (block 218), and the additional video content is stored in a memory buffer (block 220).

Continuing with the flowchart on FIG. 2C, in the event the user has set a time limit for reading the closed captions received from the buffer (decision block 222 is Yes), a determination is made if the time limit for reading the closed captions has been exceeded (decision block 228). In the event the user has not set a time limit for reading the closed captions (decision block 222 is No), a determination is made if the memory buffer for video content has been exceeded (decision block 224). In the event the memory buffer for closed captioning has not been exceeded (decision block 224 is No), and the user has not manually requested video snippets to be displayed (decision block 226 is No), the process loops back to block 222. In the event the time limit for reading the closed captions has been exceeded (decision block 222 and 228 are Yes), the memory buffer for video content has been exceeded (decision block 224 is Yes), or the user has requested the video snippet to be displayed (decision block 216 is Yes), the video snippet information is retrieved from memory, and the buffer is cleared (block 230). In the event the A/V content has ended (decision block 232 is Yes) the process ends. (block 236). In the event the A/V content has not ended (block 232 is No) Concurrently, the display switches from closed captioning to playing a video snippet video content (block 206), and the additional closed captioning is stored in a memory buffer (block 234).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for presenting closed captioning text on device display screens, the method comprising:

receiving a continuous flow of audio video (A/V) content information;

separating closed captioning information from video content contained in the A/V content information flow;

accumulating the closed captioning information in a first memory buffer;

displaying the video content without the closed captioning information to form a first video snippet;

determining one of the following video mode conditions:

whether a first time limit for viewing the video snippet been exceeded, whether the capacity of the first memory buffer for the closed captioning been exceeded, and whether a closed caption command to display the accumulated closed captioning been received;

wherein, in the event one or more of the video mode conditions occurs:

retrieving the accumulated closed captioning from the first memory buffer;

displaying the accumulated closed caption information without the video content;

clearing the first memory buffer;

accumulating A/V content in a second memory buffer;

separating closed captioning information from video content contained in the A/V content information flow;

accumulating the closed captioning information in the first memory buffer; and accumulating the video content in a third memory buffer.

2. The method of claim 1, further comprising:

determining one of the following closed caption mode conditions:

whether a second time limit for viewing the accumulated closed caption information been exceeded, whether the capacity of the third memory buffer for the video content been exceeded, and whether a video snippet command to display the accumulated video content in the form of a second video snippet been received;

wherein in the event one or more of the closed captions mode conditions occurs:

retrieving the accumulated video content from the third memory buffer;

displaying the second video snippet;
clearing the third memory buffer;
accumulating A/V content in a second memory buffer;
separating closed captioning information from video content contained in the A/V content information flow;
accumulating the closed captioning information in the first memory buffer; and
accumulating the video content in a third memory buffer.

3. The method of claim 1, wherein the displayed accumulated closed caption information is scrollable on the display screen.

4. The method of claim 1, wherein the first and second time limits, and the close caption and video snippet commands are entered via a graphical user interface (GUI).

* * * * *